United States Patent
Katagiri et al.

(10) Patent No.: US 9,582,360 B2
(45) Date of Patent: Feb. 28, 2017

(54) SINGLE AND MULTI-CUT AND PASTE (C/P) RECONSTRUCTIVE ERROR RECOVERY PROCEDURE (ERP) USING HISTORY OF ERROR CORRECTION

(71) Applicant: International Business Machines Corporation, Armonk, NY (US)

(72) Inventors: Takashi Katagiri, Yokohama (JP); Yuhko Mori, Yokohama (JP); Pamela R. Nylander-Hill, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 122 days.

(21) Appl. No.: 14/149,758

(22) Filed: Jan. 7, 2014

(65) Prior Publication Data
US 2015/0193304 A1 Jul. 9, 2015

(51) Int. Cl.
G11C 29/00 (2006.01)
G06F 11/10 (2006.01)
G11B 20/18 (2006.01)

(52) U.S. Cl.
CPC ...... *G06F 11/1076* (2013.01); *G11B 20/1833* (2013.01); *G11B 2020/1853* (2013.01)

(58) Field of Classification Search
CPC .......... G11B 20/1886; G11B 20/10527; G06F 11/0793
See application file for complete search history.

(56) References Cited

U.S. PATENT DOCUMENTS

| | | | |
|---|---|---|---|
| 4,697,266 | A | 9/1987 | Finley |
| 5,247,523 | A | 9/1993 | Arai et al. |
| 5,684,810 | A | 11/1997 | Nakamura et al. |
| 5,844,919 | A | 12/1998 | Glover et al. |
| 5,983,384 | A | 11/1999 | Ross |
| 6,624,958 | B1 | 9/2003 | Alva |

(Continued)

FOREIGN PATENT DOCUMENTS

| | | |
|---|---|---|
| CN | 101101790 | 1/2008 |
| CN | 101611385 | 12/2009 |

(Continued)

OTHER PUBLICATIONS

U.S. Appl. No. 13/676,477, filed Nov. 14, 2012.

(Continued)

*Primary Examiner* — Guy Lamarre
(74) *Attorney, Agent, or Firm* — Zilka-Kotab, PC

(57) ABSTRACT

In one embodiment, an apparatus for reading data from a data storage medium includes a processor and logic integrated with and/or executable by the processor, the logic being configured to: read data from a data storage medium, the data including a plurality of data sets, determine that an error condition is detected for a data set read from the data storage medium, determine whether the data set was read from the data storage medium using multiple cut and paste (C/P) error recovery procedure (ERP) (C/P ERP Multi), and when the data set was read from the data storage medium using C/P ERP Multi: continue reading data from the data storage medium normally when the detected error condition has been overcome using C/P ERP Multi; otherwise, continue using C/P ERP Multi to read data from the data storage medium until the error condition is overcome.

20 Claims, 11 Drawing Sheets

(56) References Cited

U.S. PATENT DOCUMENTS

| | | | |
|---|---|---|---|
| 6,640,326 B1 | 10/2003 | Buckingham et al. | |
| 6,738,942 B1 | 5/2004 | Sridharan et al. | |
| 6,751,771 B2 | 6/2004 | Chuang et al. | |
| 6,757,848 B2 | 6/2004 | Bartlett | |
| 6,779,149 B1 | 8/2004 | Dong | |
| 6,862,149 B2 | 3/2005 | Maple et al. | |
| 6,920,005 B2 | 7/2005 | Yun | |
| 6,958,873 B2 | 10/2005 | Sved | |
| 7,188,299 B2 | 3/2007 | Nakagawa et al. | |
| 7,280,293 B2 | 10/2007 | Nylander-Hill et al. | |
| 7,624,328 B2 | 11/2009 | Unruh | |
| 7,840,872 B2 | 11/2010 | Andersen | |
| 7,965,462 B2 | 6/2011 | Demura et al. | |
| 7,987,404 B2 | 7/2011 | Fukuda et al. | |
| 8,108,752 B2 | 1/2012 | Tanaka | |
| 8,209,693 B2 | 6/2012 | Matsuo | |
| 8,793,552 B2 | 7/2014 | Katagiri et al. | |
| 8,810,944 B1* | 8/2014 | Katagiri | G11B 20/1886 360/53 |
| 9,053,748 B2 | 6/2015 | Katagiri et al. | |
| 9,104,576 B2* | 8/2015 | Katagiri | G11B 20/1886 |
| 9,141,478 B2 | 9/2015 | Katagiri et al. | |
| 2001/0037484 A1 | 11/2001 | Paterson | |
| 2002/0143985 A1* | 10/2002 | Goldstein | G06F 9/543 709/238 |
| 2002/0181356 A1 | 12/2002 | Watanabe et al. | |
| 2002/0194544 A1 | 12/2002 | Bartlett | |
| 2003/0066013 A1 | 4/2003 | Maple et al. | |
| 2004/0205442 A1 | 10/2004 | Chuang et al. | |
| 2005/0149819 A1 | 7/2005 | Hwang | |
| 2005/0207305 A1 | 9/2005 | Park | |
| 2008/0098280 A1 | 4/2008 | Andersen | |
| 2008/0155374 A1 | 6/2008 | Tanaka | |
| 2008/0222490 A1 | 9/2008 | Leung et al. | |
| 2008/0235556 A1 | 9/2008 | Eleftheriou et al. | |
| 2008/0320361 A1 | 12/2008 | Fukuda et al. | |
| 2009/0287956 A1 | 11/2009 | Flynn et al. | |
| 2010/0162083 A1 | 6/2010 | Chung et al. | |
| 2012/0002317 A1 | 1/2012 | Hirata et al. | |
| 2012/0206831 A1 | 8/2012 | Katagiri et al. | |
| 2013/0086422 A1* | 4/2013 | Huang | G06F 11/26 714/32 |
| 2014/0136918 A1 | 5/2014 | Katagiri et al. | |
| 2014/0136919 A1 | 5/2014 | Katagiri et al. | |
| 2014/0189460 A1 | 7/2014 | Katagiri et al. | |
| 2015/0026510 A1 | 1/2015 | Katagiri et al. | |
| 2015/0193303 A1 | 7/2015 | Katagiri et al. | |
| 2015/0256205 A1 | 9/2015 | Katagiri et al. | |
| 2015/0302888 A1 | 10/2015 | Katagiri et al. | |
| 2015/0371676 A1 | 12/2015 | Katagiri et al. | |

FOREIGN PATENT DOCUMENTS

| | | |
|---|---|---|
| DE | 102007046789 A1 | 4/2008 |
| EP | 1758023 | 2/2007 |
| EP | 2199911 A1 | 6/2010 |
| WO | 2008109586 | 9/2008 |

OTHER PUBLICATIONS

U.S. Appl. No. 13/676,493, filed Nov. 14, 2012.
U.S. Appl. No. 13/943,674, filed Jul. 16, 2013.
Non-Final Office Action from U.S. Appl. No. 13/676,477 dated Dec. 24, 2013.
International Search Report and Written Opinion from PCT Application No. PCT/CN2013/084934, dated Jan. 16, 2014.
Notice of Allowance from U.S. Appl. No. 13/676,477, dated Oct. 29, 2014.
U.S. Appl. No. 14/285,271, filed May 22, 2014.
Final Office Action from U.S. Appl. No. 14/285,271, dated Jan. 30, 2015.
Notice of Allowance and Fee(s) Due from U.S. Appl. No. 13/943,674 dated Apr. 4, 2014.
Notice of Allowance from U.S. Appl. No. 13/676,477, dated Feb. 2, 2015.
Notice of Allowance from U.S. Appl. No. 14/285,271, dated Apr. 7, 2015.
Notice of Allowance from U.S. Appl. No. 14/149,752, dated May 20, 2015.
Corrected Notice of Allowability from U.S. Appl. No. 14/285,271, dated May 20, 2015.
Katagiri et al., U.S. Appl. No. 14/720,703, filed May 22, 2015.
Katagiri et al., U.S. Appl. No. 14/752,923, filed Jun. 27, 2015.
Corrected Notice of Allowability from U.S. Appl. No. 14/149,752, dated Jul. 9, 2015.
Final Office Action from U.S. Appl. No. 13/676,477 dated Jul. 18, 2014.
Non-Final Office Action from U.S. Appl. No. 14/285,271 dated Jul. 21, 2014.
Examination Report from United Kingdom Application No. GB1509708.2, dated Jul. 14, 2015.
Corrected Notice of Allowability from U.S. Appl. No. 14/149,752, dated Aug. 3, 2015.
Katagiri et al., U.S. Appl. No. 14/838,317, filed Aug. 27, 2015.
Notice of Allowance and Fee(s) Due from U.S. Appl. No. 13/676,493 dated Jan. 10, 2014.
Notice of Allowance and Fee(s) Due from U.S. Appl. No. 13/676,493 dated Mar. 14, 2014.
Katagiri et al., U.S. Appl. No. 14/199,911, filed Mar. 6, 2014.
Notice of Allowance and Fee(s) Due from U.S. Appl. No. 13/943,674 dated Feb. 19, 2014.
Katagiri et al., U.S. Appl. No. 14/149,752, filed Jan. 7, 2014.
Office Action from German Application No. 112013005453.1, dated Jan. 14, 2016.
Non-Final Office Action from U.S. Appl. No. 14/199,911, dated Feb. 1, 2016.
Examination Report from United Kingdom Application No. GB1509708.2, dated Feb. 9, 2016.
Non-Final Office Action from U.S Appl. No. 14/838,317, dated Apr. 5, 2016.
Final Office Action from U.S. Appl. No. 14/752,923, dated May 5, 2016.
Final Office Action from U.S. Appl. No. 14/720,703, dated Jun. 8, 2016.
Non-Final Office Action from U.S. Appl. No. 14/720,703, dated Oct. 7, 2015.
Non-Final Office Action from U.S. Appl. No. 14/752,923, dated Oct. 29, 2015.
Notice of Allowance from U.S. Appl. No. 14/752,923, filed Jul. 13, 2016.
Notice of Allowance from U.S. Appl. No. 14/720,703, dated Aug. 31, 2016.
Non-Final Office Action from U.S. Appl. No. 14/199,911, dated Sep. 16, 2016.
Notice of Allowance from U.S. Appl. No. 14/838,317, dated Sep. 22, 2016.
Notice of Allowance from U.S. Appl. No. 14/752,923, dated Oct. 13, 2016.
Notice of Allowance from U.S. Appl. No. 14/720,703, dated Oct. 25, 2016.

* cited by examiner

SINGLE AND MULTI-CUT AND PASTE (C/P) RECONSTRUCTIVE ERROR RECOVERY PROCEDURE (ERP) USING HISTORY OF ERROR CORRECTION

RELATED APPLICATIONS

This application is related to U.S. Pat. Nos. 9,053,748 and 8,793,552, filed Nov. 14, 2012, and U.S. Pat. No. 8,810,944, filed Jul. 16, 2013, which are herein incorporated by reference.

BACKGROUND

The present invention relates to data storage, and more particularly, to reading data from tape selectively using single and/or multi-cut and paste (C/P) reconstructive error recovery procedure (ERP) which relies on a history of error to reduce backhitches during error burst scenarios.

Tape and optical storage devices use very powerful error correction codes, such as product codes or concatenated codes, in conjunction with interleaving to provide a very high degree of data integrity. These error correction schemes typically use two error correction codes (ECCs) as component codes. Two important burst-error performance measures for tape storage systems protected by these schemes are: 1) lateral width of an erroneous stripe which is still capable of being corrected (this is also known as "broken track correction" capability), and 2) longitudinal width of an erroneous stripe that is still capable of being corrected. A "broken" track generally refers to a track that cannot be read correctly due to a problem on the media itself and/or a problem with the readback channel, e.g., as a channel that does not detect data correctly because of alignment or some systematic problem with the head.

Magnetic tapes may store data in the form a "data sets" or files. Each data set is encoded using interleaved sets of codewords that are organized into an ECC-encoded matrix of size M bytes×N bytes (M×N) and then written to tape as shown in FIG. 1, according to the prior art. There are two levels of encoding within this matrix 150. The first level of encoding utilizes the matrix rows 102. Each row 102 of the matrix contains C1-ECC row parity 106, which adds p-bytes of C1-ECC to the n-bytes of user data (e.g., N=n+p bytes). The second level of encoding, C2-ECC column parity 108, adds q-bytes of C2-ECC to each matrix column 104. For example, if q=12, then adding 12 bytes of C2-ECC would add 12 rows to the matrix 150 (e.g., M=m+q bytes).

However, many temporary errors may occur during reading of the data (data sets) from the tape media. One such condition is called a "temp burst" or "error burst" (comprising a plurality of errors or temporary errors within a predetermined distance on the magnetic tape). Under an error burst condition, a tape drive may not be able to correct all errors encountered while reading the data from the tape in a predetermined amount of time, and reports these errors as one or more permanent errors. For example, when the data set is read from the tape in a high error rate condition, C1/C2 ECC is not capable of correcting the read data. For example, in some approaches, C1-encoding is capable of correcting 10 bytes of error, and C2-encoding is capable of correcting 20 bytes of error. If the error bytes exceed this correction power, then data cannot be read from the tape. In this scenario, the tape drive will then attempt ERP to read the data set from the tape again with a different hardware setting (e.g., changing the tape speed). ERP repeats until C1/C2-encoding is able to correct the data or until the ERP retry count exceeds a threshold. If the retry count exceeds the threshold, then the tape drive will report a permanent error for the read operation.

When an error burst is encountered while reading data from the magnetic tape, there are several different methods of attempting to handle the error burst. One method is "Reconstructive Error Recovery Procedure (ERP) Using Reserved Buffer," which is described in more detail in U.S. patent application Ser. No. 13/676,477, filed Nov. 14, 2012, which has been incorporated by reference. This method uses a reconstructive ERP to reduce backhitches during error burst scenarios, and is referred to herein as C/P ERP Single.

Another such method is referred to as an "Iterative Cut and Paste Error Recovery Procedure" (C/P ERP Multi), which is described in more detail in U.S. patent application Ser. No. 13/676,493, filed Nov. 14, 2012, which has been incorporated by reference. This method attempts to solve burst reading errors for a tape drive reading a magnetic tape. However, the C/P ERP Multi uses a dedicated buffer area of a predetermined size, which is allocated regardless of other performance concerns (such as whether the tape drive has detected an error burst or not). Therefore, this usage of the dedicated buffer causes performance degradation for normal reading.

C/P ERP Multi typically utilizes a ring buffer of a type known in the art. The tape drive has a buffer memory which is divided and allocated to each segment and is referred to as a ring buffer because data is stored in the buffer from a starting point to an end point, and when more data needs to be stored, the starting point is again utilized (possibly overwriting data already stored therein). A tape drive reads/writes the data from/to magnetic tape media in units referred to as data sets and stores each data set into each segment. Segments are filled from top to bottom and back to top, repeatedly.

C/P ERP Multi improves performance under an error burst condition; however, the procedure utilizes a portion of the reserved buffer area. The procedure divides the ring buffer into two portions and uses one of these portions for storing data during the C/P ERP Multi procedure. The other portion of the ring buffer remains accessible by the tape drive for normal operation (reading/writing). As a result, the normal or typical ring buffer size is reduced and the ordinary streaming read performance (read performance that is possible when no error burst occurs) is degraded.

The two methods of C/P ERP (single cut/paste or multi-cut/paste) are available to conventional tape drives and must be selected by the tape drive before reading data. The drive must examine dynamic recovery performance criteria to determine which technique, C/P ERP Multi or C/P Single, will be the more effective choice. In configuring the drive for C/P ERP Multi operation, the drive may choose a buffer segmentation ratio based on dynamic performance criteria. Dynamically allocating a ring buffer is described in more detail in U.S. patent application Ser. No. 13/943,674, filed Jul. 16, 2013, which has been incorporated by reference.

However, in a typical tape drive, there is no ability to intelligently choose between C/P ERP Single and C/P ERP Multi when reading data from a medium, and instead the tape drive reacts to error burst conditions.

BRIEF SUMMARY

In one embodiment, an apparatus for reading data from a data storage medium includes a processor and logic integrated with and/or executable by the processor, the logic being configured to: read data from a data storage medium, the data including a plurality of data sets, determine that an error condition is detected for a data set read from the data storage medium, determine whether the data set was read from the data storage medium using multiple cut and paste (C/P) error recovery procedure (ERP) (C/P ERP Multi), and when the data set was read from the data storage medium using C/P ERP Multi: continue reading data from the data storage medium normally when the detected error condition has been overcome using C/P ERP Multi; otherwise, continue using C/P ERP Multi to read data from the data storage medium until the error condition is overcome.

In another embodiment, a method for reading data from a data storage medium includes reading data from a data storage medium, the data including a plurality of data sets, determining that an error condition is detected for a data set read from the data storage medium, determining whether the data set was read from the data storage medium using C/P ERP Multi, and when the data set was read from the data storage medium using C/P ERP Multi: continuing to read data from the data storage medium normally when the detected error condition has been overcome using C/P ERP Multi; otherwise, continuing to use C/P ERP Multi to read data from the data storage medium until the error condition is overcome.

In yet another embodiment, a computer program product for reading data from a data storage medium includes a computer readable storage medium having program code embodied therewith, the program code being readable and/or executable by a processor to: read data from a data storage medium, the data including a plurality of data sets, determine that an error condition is detected for a data set read from the data storage medium, determine whether the data set was read from the data storage medium using C/P ERP Multi, and when the data set was read from the data storage medium using C/P ERP Multi: continue reading data from the data storage medium normally when the detected error condition has been overcome using C/P ERP Multi; otherwise, continue using C/P ERP Multi to read data from the data storage medium until the error condition is overcome.

Other aspects and embodiments of the present invention will become apparent from the following detailed description, which, when taken in conjunction with the drawings, illustrates by way of example the principles of the invention.

DETAILED DESCRIPTION

Figure 1:
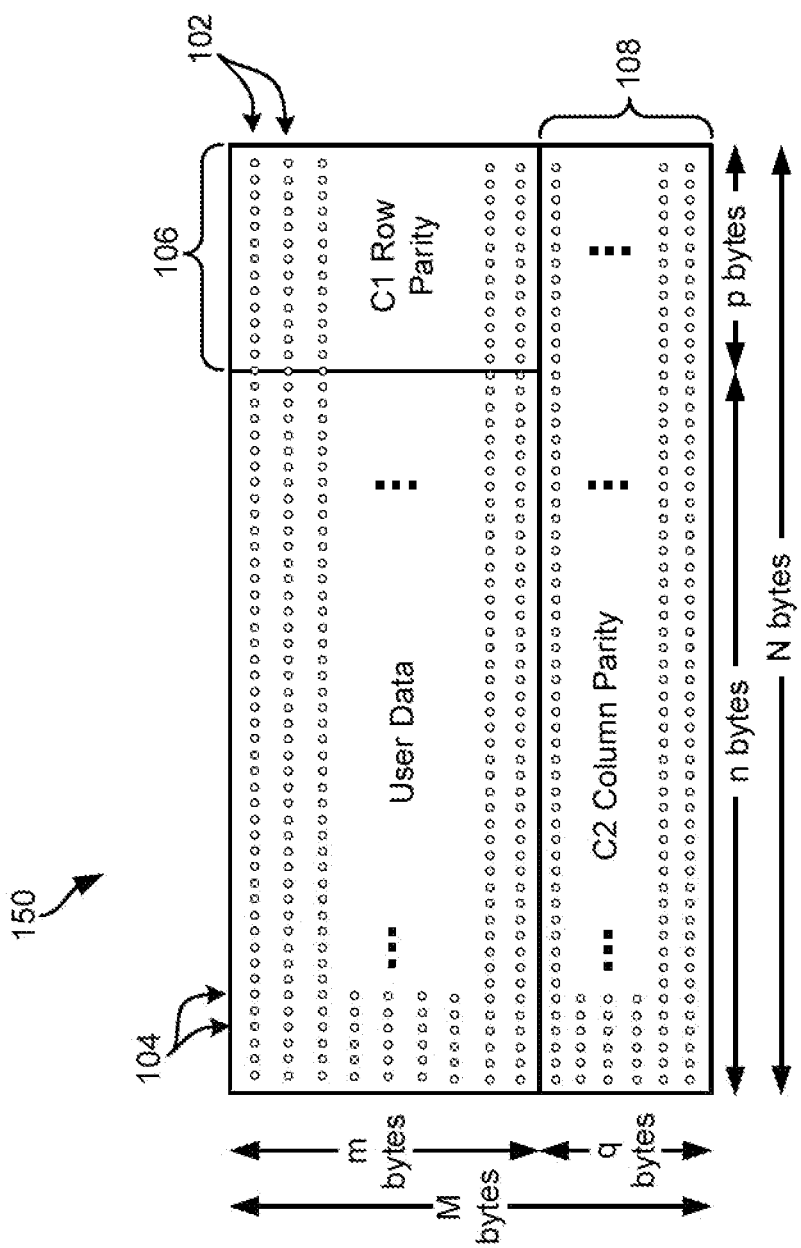
FIG. 1 shows a data set matrix, according to the prior art.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an." and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In one general embodiment, an apparatus for reading data from a data storage medium includes a processor and logic integrated with and/or executable by the processor, the logic being configured to: read data from a data storage medium, the data including a plurality of data sets, determine that an error condition is detected for a data set read from the data storage medium, determine whether the data set was read from the data storage medium using multiple cut and paste (C/P) error recovery procedure (ERP) (C/P ERP Multi), and when the data set was read from the data storage medium using C/P ERP Multi: continue reading data from the data storage medium normally when the detected error condition has been overcome using C/P ERP Multi; otherwise, continue using C/P ERP Multi to read data from the data storage medium until the error condition is overcome.

In another general embodiment, a method for reading data from a data storage medium includes reading data from a data storage medium, the data including a plurality of data sets, determining that an error condition is detected for a data set read from the data storage medium, determining whether the data set was read from the data storage medium using C/P ERP Multi, and when the data set was read from the data storage medium using C/P ERP Multi: continuing to read data from the data storage medium normally when the detected error condition has been overcome using C/P ERP Multi; otherwise, continuing to use C/P ERP Multi to read data from the data storage medium until the error condition is overcome.

In yet another general embodiment, a computer program product for reading data from a data storage medium includes a computer readable storage medium having program code embodied therewith, the program code being readable and/or executable by a processor to: read data from a data storage medium, the data including a plurality of data sets, determine that an error condition is detected for a data set read from the data storage medium, determine whether the data set was read from the data storage medium using C/P ERP Multi, and when the data set was read from the data storage medium using C/P ERP Multi: continue reading data from the data storage medium normally when the detected error condition has been overcome using C/P ERP Multi; otherwise, continue using C/P ERP Multi to read data from the data storage medium until the error condition is overcome.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Moreover, a system according to various embodiments may include a processor and logic integrated with and/or executable by the processor, the logic being configured to perform one or more of the process steps recited herein.

Figure 2A:
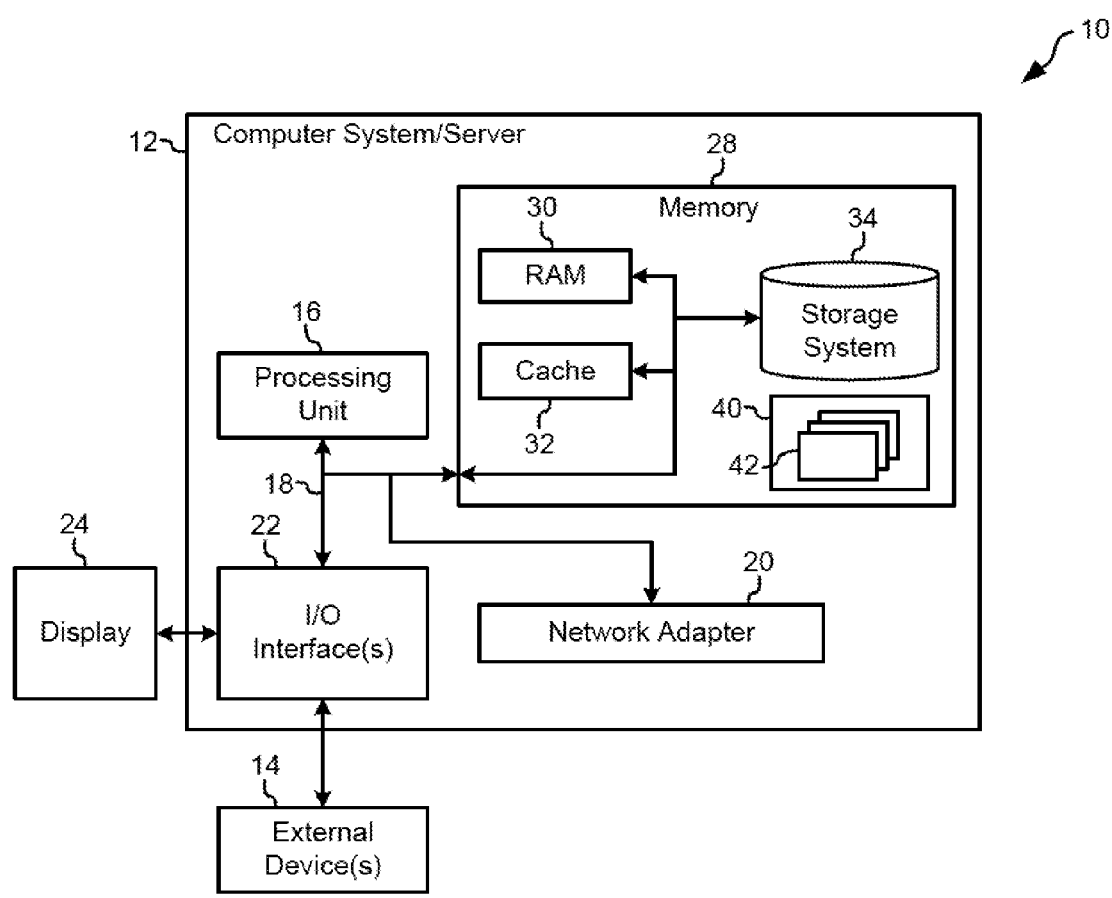
FIG. 2A illustrates a network storage system, according to one embodiment.

Referring now to FIG. 2A, a schematic of a network storage system 10 is shown according to one embodiment. This network storage system 10 is only one example of a suitable storage system and is not intended to suggest any limitation as to the scope of use or functionality of embodiments of the invention described herein. Regardless, network storage system 10 is capable of being implemented and/or performing any of the functionality set forth hereinabove.

In the network storage system 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 2A, computer system/server 12 in the network storage system 10 is shown in the form of a general-purpose computing device. The components of computer system/server 12 may include, but are not limited to, one or more processors 16 or processing units, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 may be provided for reading from and writing to a non-removable, non-volatile magnetic media—not shown and typically called a "hard disk," which may be operated in a HDD. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to bus 18 by one or more data media interfaces. As will be further depicted and described below, memory 28 may include at least one program product having a set (e.g., at least one) of program modules that are configured to carry out the functions of embodiments described herein.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication may occur via Input/Output (I/O) interfaces 22. Still yet, computer system/server 12 may communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to; microcode, device drivers, redundant processing units, external disk drive arrays, RAID systems, tape drives, and data archival storage systems, etc.

Figure 2B:
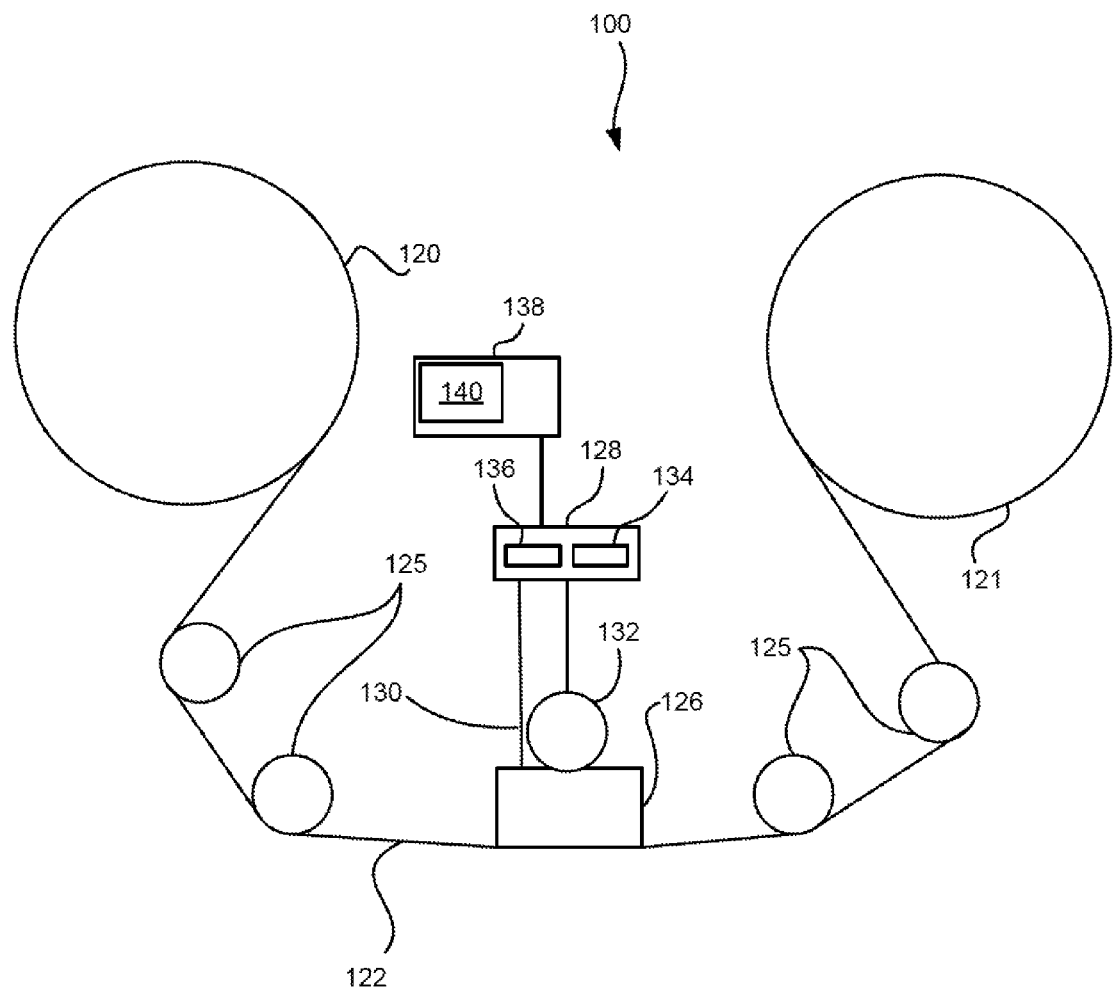
FIG. 2B illustrates a simplified tape drive of a tape-based data storage system, according to one embodiment.

FIG. 2B illustrates a simplified tape drive 100 of a tape-based data storage system, which may be employed according to various embodiments. While one specific implementation of a tape drive is shown in FIG. 2B, it should be noted that the embodiments described herein may be implemented in the context of any type of tape drive system.

As shown, a tape supply cartridge 120 and a take-up reel 121 are provided to support a tape 122. One or more of the reels may form part of a removable cassette and are not necessarily part of the tape drive 100. The tape drive, such as that illustrated in FIG. 2B, may further include drive motor(s) to drive the tape supply cartridge 120 and the take-up reel 121 to move the tape 122 over a tape head 126 of any type.

Guides 125 guide the tape 122 across the tape head 126. Such tape head 126 is in turn coupled to a controller assembly 128 via a cable 130. The controller 128 typically comprises a servo channel 134 and data channel 136 which includes data flow processing. It controls reel motion (not shown in FIG. 2B) and head functions, such as track following, writing, reading, etc. The cable 130 may include read/write circuits to transmit data to the head 126 to be recorded on the tape 122 and to receive data read by the head 126 from the tape 122. An actuator 132 moves the head 126 to a set of tracks on the tape 122 in order to perform a write or a read operation.

In one embodiment, the tape drive 100 may comprise a data buffer 138 which is accessible by the tape drive 100 and the controller 128. This data buffer 138 may be split into one or more sections, with one section being a reserved data buffer 140 to be used for storage of partial data sets during reading operations from the tape 122.

An interface may also be provided for communication between the tape drive 100 and a host (integral or external) to send and receive the data and for controlling the operation of the tape drive 100 and communicating the status of the tape drive 100 to the host, as would be understood by one of skill in the art.

Various types of error correction code (ECC) schemes are used in data storage to achieve very low bit error rates, e.g., magnetic tape and optical storage products are designed to ensure bit error rates in the range of $1 \times 10^{-7}$ to $1 \times 10^{-19}$ under normal operating conditions. Linear block codes, such as Reed-Solomon (RS) codes and low-density parity-check (LDPC) codes, have generally been preferred ECC schemes used in data storage products.

According to one embodiment, a reconstructive data recovery method uses a reserved data buffer portion of a tape drive's data buffer to store data from repeated data set read recovery attempts. The encoded data is reconstructed iteratively as an error recovery procedure (ERP) repeats data set re-read from a tape to the reserved data buffer. In single cut/paste error recovery procedure (C/P ERP Single), one data set is read repeatedly until all rows thereof are correctly read and/or corrected and the data set is assembled from the accumulated rows, or a maximum number of iterations are achieved and any remaining errors are reported as permanent. In multiple cut/paste error recovery procedure (C/P ERP Multi), a plurality of data sets are read repeatedly until each row of each of the data sets are correctly read and/or corrected and each data set is assembled from its accumulated rows, or a maximum number of iterations are achieved and any remaining errors are reported as permanent in any data sets which have rows which are not read correctly and/or corrected.

After each read of data from the tape, it may be determined which rows, each row including C1-encoded data, are satisfactory (referred to as good C1 rows) and which are not. This determination may be based on whether the C1 row has no errors or if the errors are correctable using C1-ECC. In the first read, all rows are stored to the reserved data buffer regardless of the quality of the read. However, in each subsequent read of the data from the tape, only those C1 rows which are better than a C1 row already stored to the reserved data buffer is written to the reserved data buffer in order to replace the C1 row currently stored thereto. In one embodiment, the C1 rows may be stored to the reserved data buffer after an ERP retry step has completed (e.g., one reread of data from the tape).

According to one scenario, when the error occurs randomly between each of the ERP retry steps, then different C1 rows will be uncorrectable in each ERP reread. Accordingly, by aggregating good C1 rows in the reserved data buffer, a complete data read with good C1 rows will be assembled in the reserved data buffer through repeated ERP retry steps. In contrast, with conventional methods, each reread would be analyzed separately, and regardless of the good C1 rows that are present, when a sufficient number of bad C1 rows are read, the entire data set will be deemed to be uncorrectable and another ERP retry step will be performed. With the present method, each reread can accumulate good C1 rows in the reserved data buffer, and when C2-ECC is subsequently able to correct the data, then the error is recovered, the ERP retry steps will cease, and the entire reconstructed data set will be copied from the reserved data buffer and sent to the host.

By utilizing the methods described herein according to various embodiments to read data from a tape, it is possible to recover errors even though there is no hardware setting that is capable of reading the data from the tape in a recoverable state in a single retry. Therefore, by using the methods described herein according to various embodiments, the elapsed time used for ERP is reduced, since good C1 rows are assessed after each reread with different hardware settings (an ERP retry), are accumulated in the reserved data buffer, and then assembled to reconstruct the entire data set. This process may be extended in C/P ERP Multi across a plurality of data sets, or may be used on a single data set in C/P ERP Single.

In this fashion, the number of repeated ERP retries may all contribute to recovering the error(s) and lead to quicker read data recovery. Using current methods, unless the data read from the tape in a single ERP retry has fewer error bytes than the allowed C1/C2 threshold, the data set cannot be recovered. Accordingly, using conventional methods, ERP retries are repeated multiple times until the drive finds a suitable hardware setting to read the error data set completely in a single reread attempt.

However, there are no methods or mechanisms in a typical tape drive which provides guidance to the tape drive as to which C/P ERP technique to use. It may be quite complex to determine which technique to use and for what reason in order to dynamically choose between use of C/P ERP Single and C/P ERP Multi. There are performance impacts related to reallocation of the buffer, so optimizing the decision improves overall drive performance.

C/P ERP Multi is an effective method to mitigate error burst conditions during read, and dynamic buffer allocation (which is enabled only when C/P Multi is in use) mitigates the impact of a fixed buffer allocation on normal streaming read performance. One way to determine when to use C/P ERP Multi is based on a detected burst condition. A burst condition may be defined as a recovered error count which exceeds a threshold over a defined range of data sets. When the recovered error count exceeds the threshold value, but the span of involved data sets is greater than the allowed range, then a burst condition is cleared or remains undetected.

Typically, when a burst condition is detected, then error recovery automatically switches to C/P ERP Multi from standard reading or C/P ERP Single. This is not always an optimal decision based on the nature of data being read; therefore, algorithms are described herein according to various embodiments to more intelligently switch between C/P ERP Single and C/P ERP Multi. Rather than relying on a simple error burst detection threshold, the algorithms compare predicted elapsed times (based on format) of each C/P ERP technique in order to select the error recovery technique which is most probable to provide better performance.

Figure 3:
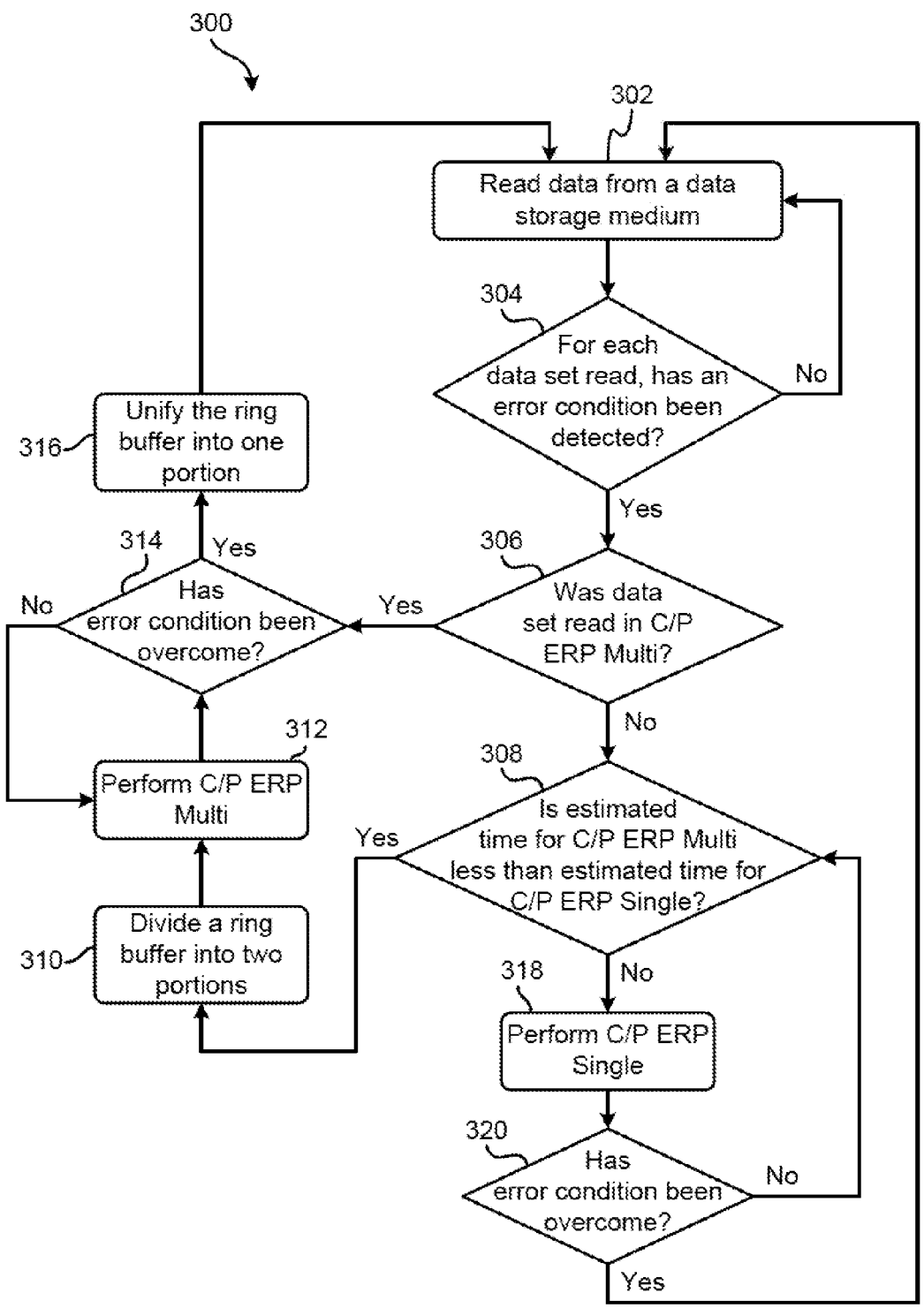
FIG. 3 shows a method for reading data from a data storage medium using a reconstructive error recovery procedure (ERP), according to one embodiment.

Now referring to FIG. 3, a method 300 for data set reconstructive ERP is shown according to one embodiment. The method 300 may be performed in accordance with the present invention in any of the environments depicted in FIGS. 1-2B, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various non-limiting embodiments, the method 300 may be partially or entirely performed by a tape drive, a hard disk drive, an optical drive, a processor (such as a CPU, an ASIC, a FPGA, etc.) which may be embedded in and/or operate within a system, a controller, a storage system manager, etc.

As shown in FIG. 3, method 300 may initiate with operation 302, where data is read from a data storage medium. In one approach, the data storage medium may be a magnetic tape that is configured to be read by a magnetic tape drive. In other approaches, the data storage medium may be an optical disk, a hard disk, or any other suitable data storage medium or device. The data may be read data set by data set, or a stream of data may be read comprising a plurality of data sets, depending on whether ERP is being used, what type of ERP, and whether an error or error burst has previously been detected.

In an initial implementation of method 300, it may be assumed that data is being read data set by data set from the data storage medium.

In operation 304, it is determined whether an error condition is detected for each data set read from the data storage medium. When an error condition is detected, the method 300 proceeds to operation 306; otherwise, the method 300 returns to normal data reading in operation 302.

In one embodiment, the error condition may be a burst of temporary errors (error burst or temp burst) comprising a plurality of detected errors within a predetermined distance on the magnetic tape or some other data storage medium. In another embodiment, this error may be one or more errors affecting only one data set or randomly affecting one or more data sets within the data read from the data storage medium.

In one embodiment, method 300 may only proceed to operation 306 when the error condition is an error burst. Otherwise, the method 300 may return to operation 302 to continue reading data. The detected error condition may be handled using conventional ERP techniques not described herein, but known in the art when the error condition is not an error burst, according to this embodiment. In another embodiment, when the error is not an error burst, the detected error condition may be handled using C/P ERP Single.

In operation 306, it is determined whether a current data set was read using C/P ERP Multi. In one embodiment, when C/P ERP Multi is performed, a starting data set or segment, S, may be indicated (and stored). C/P ERP Multi may be set to be used on the next n data sets, and therefore each time a current data set, C, is read from the data storage medium, it may be determined whether $S \leq C \leq S+n$. As long as this condition is satisfied, then the currently read data set, C, was read using C/P ERP Multi.

When the current data set was read using C/P ERP Multi, the method 300 proceeds to optional operation 314 (or when optional operation 314 is not included, method 300 returns to reading data from the data storage medium in operation 302, albeit while using C/P ERP Multi); otherwise, the method 300 proceeds to operation 308.

In operation 308, it is determined whether an estimated amount of time to read a next set of n data sets using C/P ERP Multi is less than an estimated amount of time to read the n data sets using C/P ERP Single. These calculations, in one embodiment, may be based on historical data set recovery information over the n preceding data sets, thereby providing a sliding window with which to use historical recovery information over the last n data sets in order to determine future recovery times over the next n data sets.

The predefined number of data sets, n, may be selected based on any number of factors, including but not limited to, limited historical information being available (only a certain number of data sets may have already been read, and/or recovery information may not be available for some previously read data sets, and/or some previous data sets may not have required recovery), user desires, input, and/or selection when presented with options on how many data sets to analyze, time constraints on time/processing used to compute estimated time when too many data sets are analyzed, etc. In one embodiment, an inclusive range (which includes end points) between about 5 and about 72 read data sets, or more or less, may be analyzed, such as about 10, 16, 20, 32, 48, 64, etc.

In this way, historical information regarding how data sets have been read, what type of ERP worked previously, and how many error conditions were encountered over a previous n data sets may be used to determine an estimate as to how long it will take to read the next n data sets from the data storage medium.

For example, when the error condition is an error burst, C/P ERP Multi may be determined to be most beneficial to resolving the errors. Switching from using C/P ERP Single to C/P ERP Multi may be primarily based on a decision that an elapsed time needed to perform a C/P ERP Multi session will be significantly shorter than an elapsed time needed to perform ongoing C/P ERP Single sessions in a region of tape experiencing a high temp error rate.

This technique is a departure from typical decisions, which rely on a recovered error count exceeding a threshold over a defined range of data sets which would result in C/P ERP Multi being used. Conventional algorithms switch to C/P ERP Multi from C/P ERP Single based on that detection only. However, with this predicted performance data, an optimal C/P ERP technique may be selected more often than with a simple error count calculation.

When the estimated amount of time that would have elapsed to read the n data sets using C/P ERP Multi is less than the estimated amount of time that would have elapsed to read the n data sets using C/P ERP Single, the method 300 proceeds to optional operation 310 (or to operation 312 where C/P ERP Multi is performed over a plurality of data sets if optional operation 310 is omitted); otherwise, the method 300 proceeds to operation 318 and C/P ERP Single is performed over single data sets at a time. This is because the basic difference between C/P ERP Single and Multi is that C/P ERP Multi continues reading beyond any data set(s) having an error condition detected in a given range (n) of data sets, whereas C/P ERP Single stops reading on a first data set having an error condition detected. Which C/P ERP technique is selected may impact read performance positively (reduce amount of time elapsed to read data from data storage medium) or negatively (increase amount of time elapsed to read data from data storage medium) in error burst conditions, so a performance estimation algorithm is used to best select between the two C/P ERP techniques.

In one embodiment, a calculation for determining an estimated amount of elapsed time to perform C/P ERP Multi, $T_m$, for a number of data sets, n, read from a magnetic tape medium may be performed according to the following equation:

$$T_m = (4 \cdot V/A + 2 \cdot l \cdot n/V) - R1$$

In this equation, V is velocity of the tape movement (a maximum velocity of the tape), A is the accelerated velocity of the tape movement, l is the length on tape of one data set, R1 is a maximum retry count per data set during the last n data sets read, and n is the number of data sets that C/P ERP Multi was/is being attempted on. Therefore, n is also related to an amount of space in the ring buffer being used for the C/P ERP Multi that is needed to store the n data sets.

Furthermore, in one embodiment, a calculation for determining an estimated amount of elapsed time to perform C/P ERP Single, $T_s$, repeatedly for a number of data sets, n, read from a magnetic tape medium may be performed according to the following equation:

$$T_s = (4 \cdot V/A) \cdot R2 + l \cdot n/V$$

R2 is a total retry count across the last n data sets read, and all other variables described previously are the same in this equation.

These elapsed time estimations for C/P ERP Multi and Single may then be compared, using historical information from the last n data sets read from the data storage medium, to determine which C/P ERP technique may execute faster over the next n data sets, in one approach.

In optional operation 310, a ring buffer that may be used for storing temporary data sets read from the data storage medium for use in C/P ERP Multi may be divided intelligently into two portions. This process is described in more detail in U.S. patent application Ser. No. 13/943,674, which has been incorporated by reference. One portion of the ring buffer may be reserved for use in C/P ERP Multi.

After C/P ERP Multi is performed over a plurality of data sets in operation 312, in optional operation 314, it is determined whether the error condition identified in operation 304 has been overcome. When the error condition has been overcome, method 300 proceeds to optional operation 316 (or returns to operation 302 and data is read form the data storage medium normally when optional operation 316 is omitted); otherwise, method 300 returns to operation 312 to continue performing C/P ERP Multi in an attempt to overcome the error condition.

In optional operation 316, after performing C/P ERP Multi and overcoming the error condition, the ring buffer is unified into one portion for use in normal data reading operations. This process is described in more detail in U.S. patent application Ser. No. 13/943,674, which has been incorporated by reference.

In operation 320, after performing C/P ERP Single in operation 318, it is determined whether the error condition identified in operation 304 has been overcome. When the error condition has been overcome, method 300 returns to operation 302 and data is read form the data storage medium normally; otherwise, method 300 returns to operation 308 to once again determine which C/P ERP technique to use.

Should C/P ERP Multi and/or C/P ERP Single fail to overcome the error condition for a predetermined number of iterations of either or both C/P ERP techniques, in one embodiment, method 300 may report the error condition as being permanent and the data set(s) affected by the error condition may not be read from the data storage medium.

Figure 4:
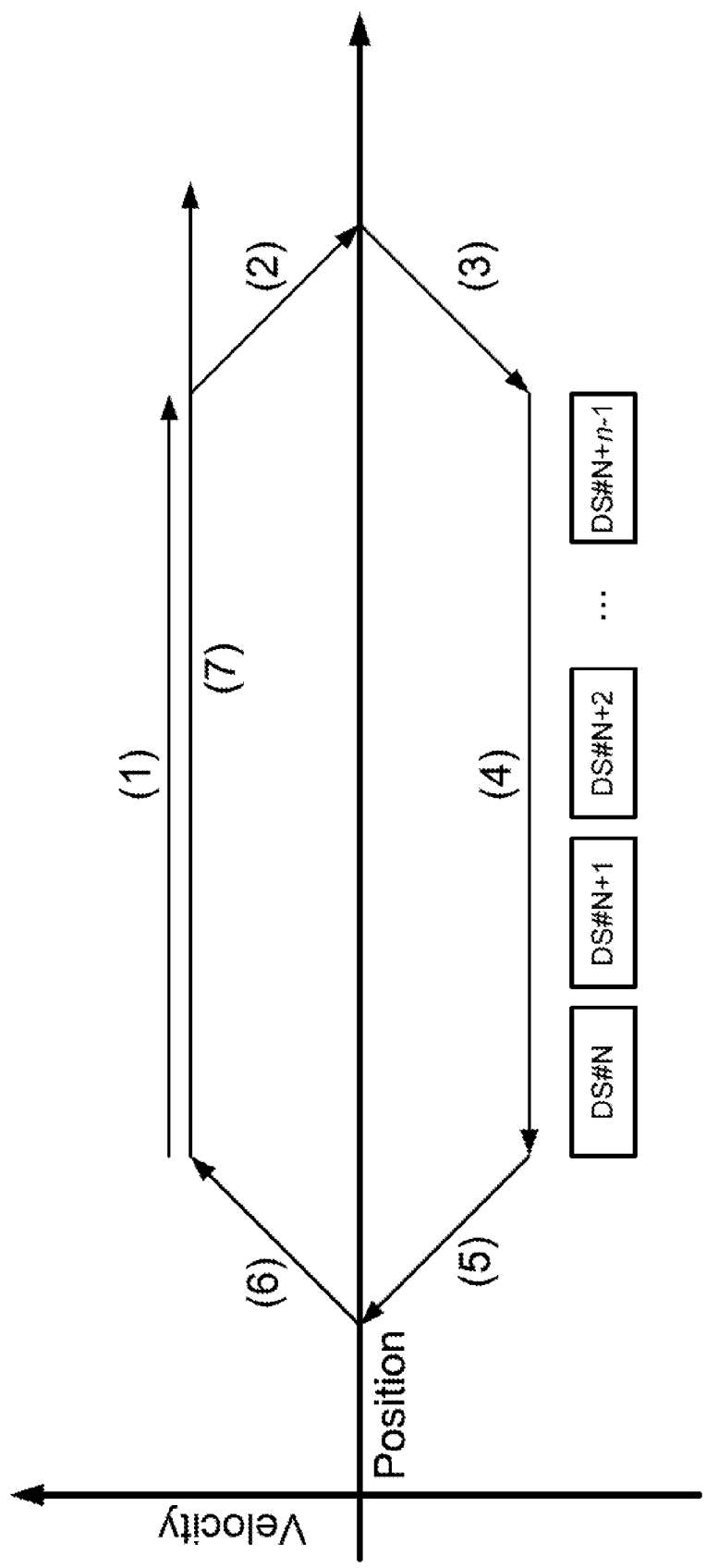
FIG. 4 shows a plot of tape velocity versus position on a tape for each step in a process of retrying data set reads, according to one embodiment.

The step motion for the above described equation to determine the estimated amount of elapsed time to perform C/P ERP Multi on n data sets, $T_m$, may proceed as described below. Referring to FIG. 4, the tape velocity versus the position on the tape is shown for each step in this process of retrying data set reads from DS#N to DS#N+n−1. Each number relates to one of the steps in the process, as marked by numbers in parenthesis in the description.

First, n data sets are read through (1), and if an error happens at DS#N and DS#N+2, then C/P ERP Multi is started from DS#N. Next, the elapsed time counting starts, as the tape is backhitched N data sets (2, 3, 4, 5) in preparation of reading the data sets again. The elapsed time for these steps may be calculated as $4 \cdot V/A + 1 \cdot n/V$, which is equivalent to the amount of time needed to backhitch plus the time to back up n data sets. Then, the n data sets are read through again (6, 7), and an amount of time needed to perform this step is calculated as $1 \cdot n/V$. When the error correction does not complete, then the tape is backhitched n data sets and reading is retried. For each retry, the retry count, which starts at zero, is incremented by one. Then, the maximum retry count from DS#N to DS#N+n−1 is set as R1.

Therefore, the estimated maximum time needed to perform C/P ERP Multi for n data sets, $T_n$, is calculated as the amount of time needed to backhitch plus two times the time needed to read n data sets, times the maximum amount of retries, $T_m = (4 \cdot V/A + 2 \cdot 1 \cdot n/V) \cdot R1$.

Figure 5:
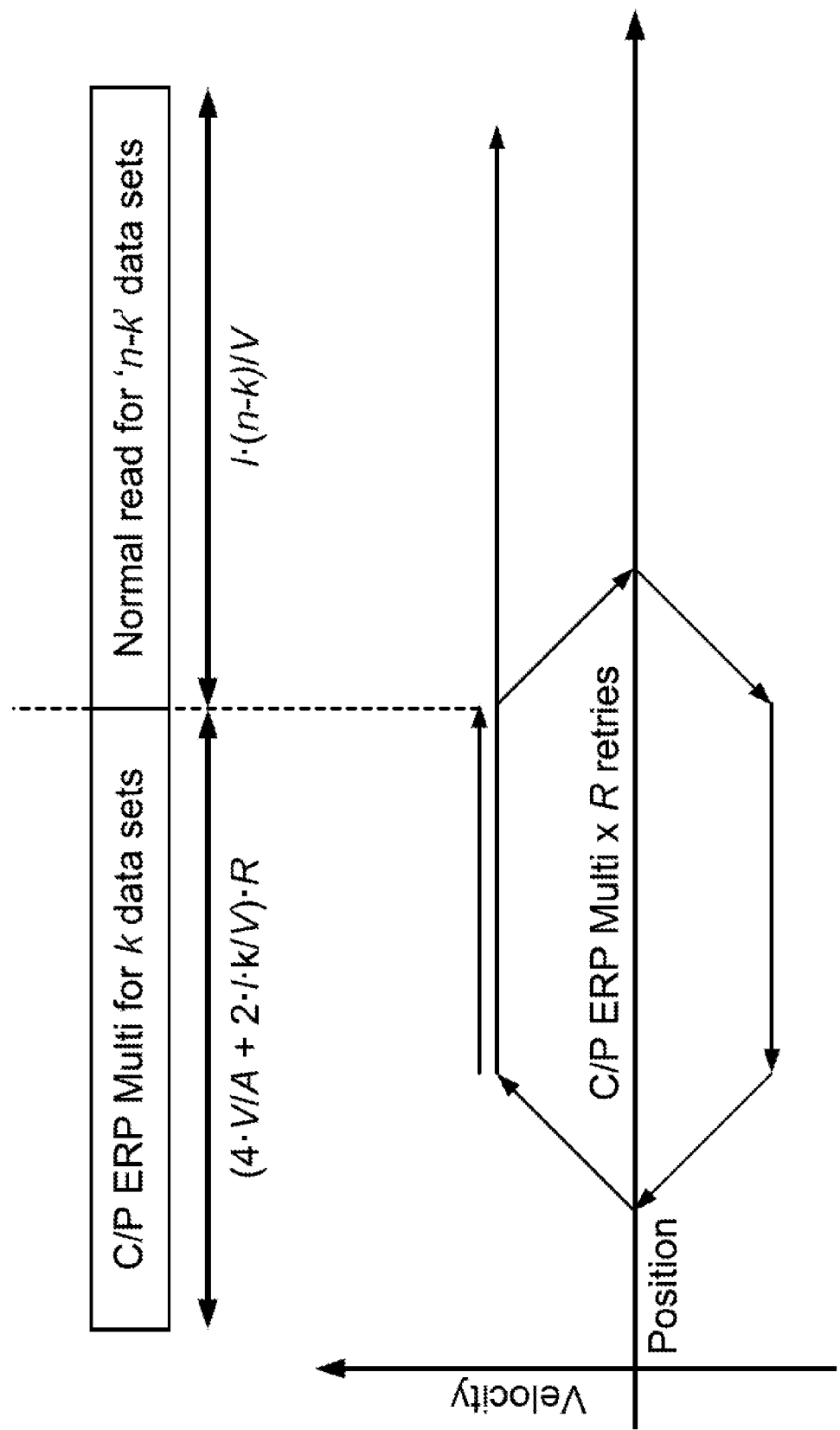
FIG. 5 shows a plot of tape velocity versus position on a tape for each step in ERP for a plurality of data sets, according to one embodiment.

With reference to FIG. 5, when the error condition and the count is estimated and it is less than n, then the elapsed time needed to perform error correction will be less by performing C/P ERP Multi for k data sets (k<n) and the rest of the data sets are read normally. If C/P ERP Multi is performed for k data sets, then the estimated time to perform C/P ERP Multi for k data sets, $T_k$, is defined as below.

$$T_k = (4 \cdot V/A + 2 \cdot 1 \cdot k/V) \cdot R + 1 \cdot (n-k)/V$$

In this case, the number of data sets reread, k, is also equal to the number of data sets needed in the portion of the ring buffer used for C/P ERP.

The elapsed time needed to perform C/P ERP Multi for n data sets versus k data sets, $T_m - T_k$, may be calculated according to the following equation:

$$T_m - T_k = (4 \cdot V/A + 2 \cdot 1 \cdot n/V) \cdot R1 - (4 \cdot V/A + 2 \cdot 1 \cdot k/V) \cdot R1 + 1 \cdot (n-k)/V$$

This equation may be simplified to $1/V \cdot (n-k) \cdot (2R1-1)$. If n−k>0 and R1>0, then $1/V \cdot (n-k) \cdot (2R1-1) > 0$. Therefore, the elapsed time needed to perform C/P ERP Multi for n data sets, $T_m$, is always greater than the time needed to perform C/P ERP Multi for k data sets, $T_k$.

For example, the elapsed time needed for C/P ERP Multi may be calculated as shown below under the following conditions: V=8.473 [m/sec], A=10 [m/sec/sec], l=0.7 [m], n=100, k=50, and R=3.

$$T_m = (8.473/10*4 + 2*0.7*100/8.473)*3 = 59.73 \text{ [sec]}$$

$$T_k = (8.473/10*4 + 2*0.7*50/8.473)*3 + 0.7*(100-50)/8.473 = 39.08 \text{ [sec]}$$

Therefore, as this case study further supports, the time needed to perform C/P ERP Multi for n data sets, $T_m$, is greater than the time needed to perform C/P ERP Multi for k data sets. $T_k$.

Figure 6:
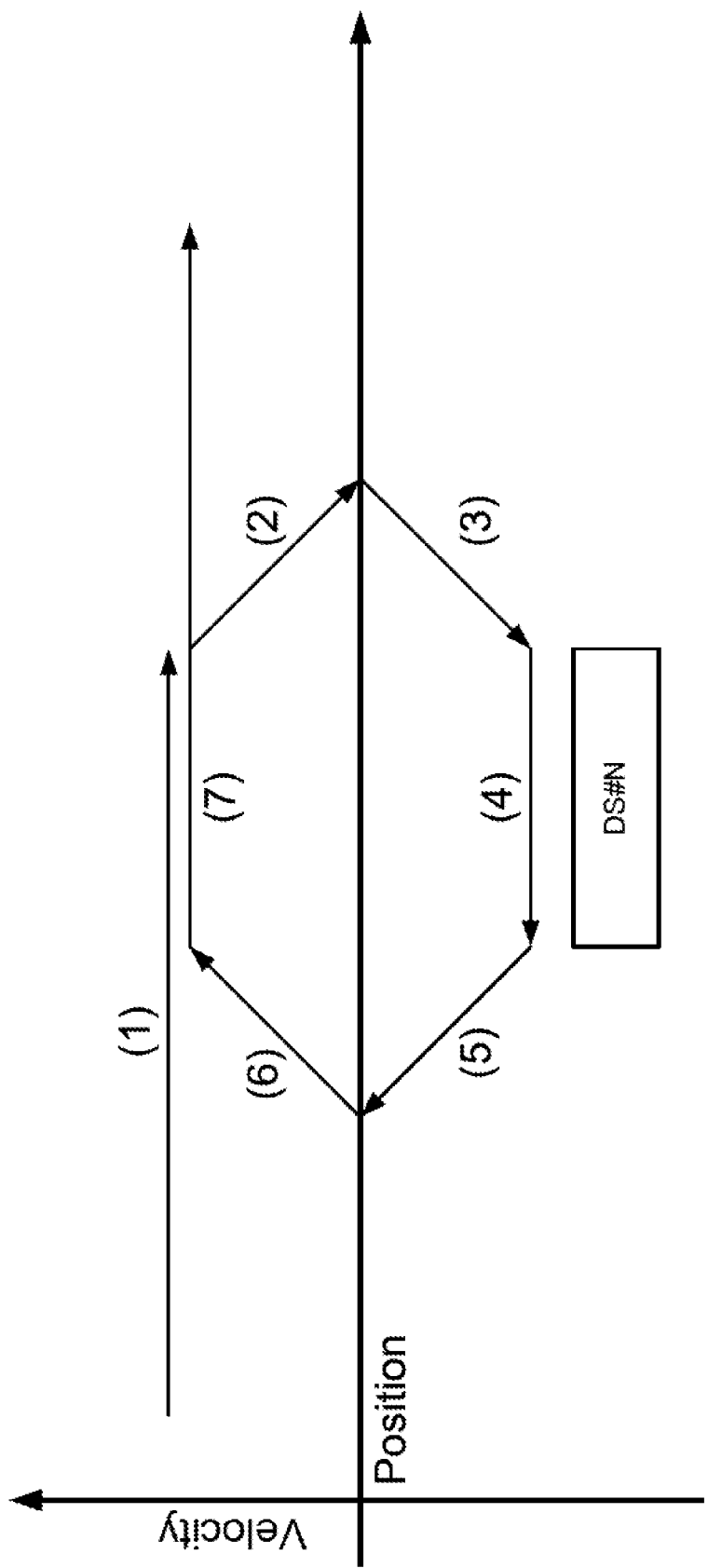
FIG. 6 shows a plot of tape velocity versus position on a tape for each step in ERP for a single data set, according to one embodiment.

Of course, the determination of the elapsed time needed to perform the two different C/P ERP Multi techniques may alternately be performed using any suitable conventional approximation technique known in the art, in other approaches. The step motion for the above described equation to determine the estimated amount of elapsed time to perform C/P ERP Single on n data sets, $T_s$, may proceed as described below. Referring to FIG. 6, the tape velocity versus the position on the tape is shown for each step in this process of retrying a data set read of DS#N. Each number relates to one of the steps in the process, as marked by numbers in parenthesis in the description.

First, one data set is read at (1), and if an error happens at DS#N, then C/P ERP Single may be started for DS#N. Next, the elapsed time counting starts, as the tape is backhitched for data set #N (2, 3, 4, 5, 6) in preparation of reading DS#N again. The elapsed time for these steps may be calculated as $4 \cdot V/A + 1/V$, which is equivalent to the amount of time needed to backhitch and prepare to read DS#N again. Then, DS#N is read through again (7), and an amount of time needed to perform this step is calculated as $1/V$.

Figure 7:
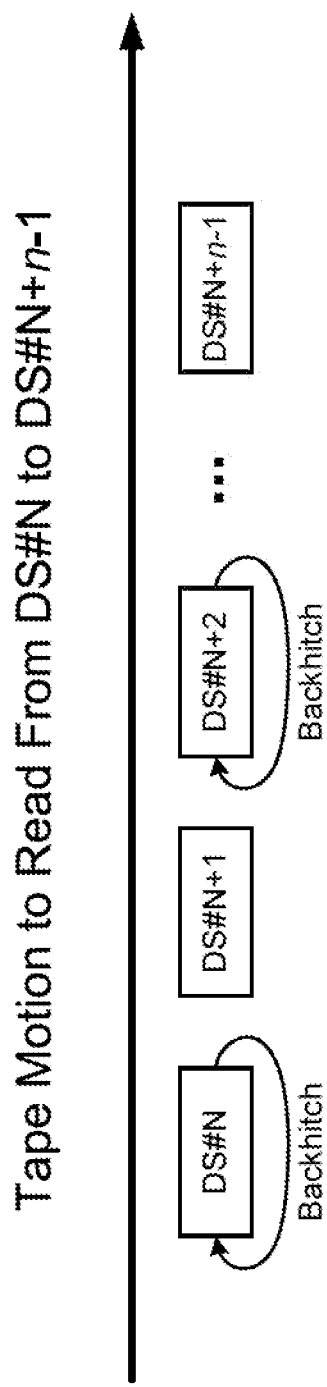
FIG. 7 shows a plot of tape velocity versus position on a tape for each step in ERP for a series of single data sets, according to one embodiment.

After the error correction corrects DS#N, referring to FIG. 7, the reading process is repeated for DS#N+1 to DS#N+n−1. The total read time for these data set reads is $1 \cdot n/V$. When the error correction does not complete, then the tape is backhitched and reading is retried for each data set on which it did not complete. Assuming, as was done previously for C/P ERP Multi, that errors occur for DS#N and DS#N+2, the same tape motion to backhitch is repeated. By setting the total retry count from DS#N to DS#N+n−1 to R2, then C/P ERP Single will recover errors by R2 times.

Therefore, the estimated maximum time needed to perform C/P ERP Single for n data sets, $T_s$, is calculated as the amount of time needed to backhitch plus the time to read one data set multiplied by the maximum amount of retries plus the time needed to read n data sets, $T_s = (4 \cdot V/A + 2 \cdot 1/V) \cdot R2 + 1 \cdot n/V$, but since the time needed to read one data set, $1/V$, is negligible, it may be dropped from the equation, resulting in this equation:

$$T_s = (4 \cdot V/A) \cdot R2 + 1 \cdot n/V.$$

However, in addition to deciding whether to use C/P ERP Multi instead of C/P ERP Single or some other ERP technique, the actual division of the ring buffer is also determined. In this process, how many portions to create (typically two portions) and the actual number of segments to allocate to each portion of the ring buffer is determined. In accordance with another example, a divide ratio (e.g., 50:50, 60:40, 70:30, 20:80, etc.) may be determined for the ring buffer, such that the ring buffer is split into two portions (or more, where the divide ratio could be 20:60:20, 40:50:10, 10:20:50:20, etc.) and segments are allocated to each portion according to the divide ratio.

In one embodiment, allocation of the ring buffer may be determined by evaluating R1 and R2. According to this embodiment, R1 and R2 may be stored after each data set is read. These values may be stored in a memory of a tape drive, a data storage management system, a controller, or elsewhere, so that R1 and R2 are available for use in calculations whenever desired.

According to the calculation described in operation 308 of FIG. 3, it is determined whether the estimated elapsed time for C/P ERP Multi is less than the estimated elapsed time for C/P ERP Single. This relationship may be represented by the following sequence of equations. First, the initial condition may be represented by $T_m < T_s$. Then, this relationship may be expanded to $(4 \cdot V/A + 2 \cdot l \cdot n/V) \cdot R1 < (4 \cdot V/A) \cdot R2 + l \cdot n/V$. By isolating R1, the relationship becomes $R1 < [(4 \cdot V/A) \cdot R2]/(4 \cdot V/A + 2 \cdot l \cdot n/V) + l \cdot n/V \cdot (4 \cdot V/A + 2 \cdot l \cdot n/V)$. When $(4 \cdot V/A)/(4 \cdot V/A + 2 \cdot l \cdot n/V)$ is represented by P, and $l \cdot n/V \cdot (4 \cdot V/A + 2 \cdot l \cdot n/V)$ is represented by Q, the equation simplifies to $R1 < P \cdot R2 + Q$, which is a linear relationship.

Therefore, this relationship should be true in order to use C/P ERP Multi instead of C/P ERP Single. Furthermore, a condition where $R2 \geq R1$ should also be true since R2 is a total retry count during the n data sets read or to be read, and therefore should always be equal to or greater than R1.

Figure 8:
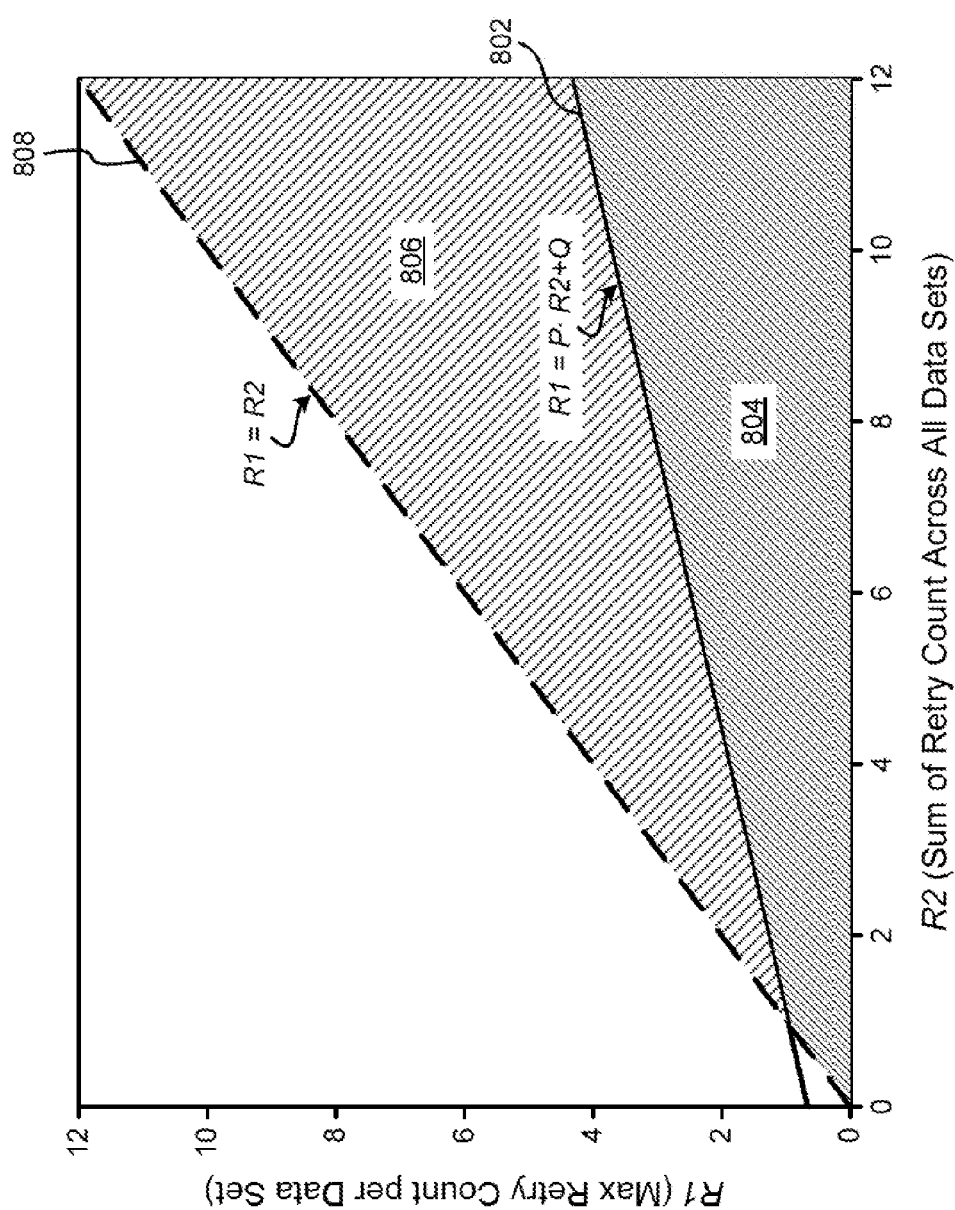
FIG. 8 shows a plot of retry variables R1 versus R2, according to one embodiment.

Now referring to FIG. 8, a plot of this linear relationship is shown according to one exemplary embodiment. In this plot, the area 804 indicates situations in which C/P ERP Multi should be used (as it will be more effective given historical context). This area 804 is upper-bounded by the combination of line 802 (representing values which satisfy $R1 = P \cdot R2 + Q$) and line 808 (representing values which satisfy $R1 = R2$), thereby corresponding to an area which satisfies both $R1 < P \cdot R2 + Q$ and $R2 \geq R1$. Moreover, the area 806 indicates situations in which C/P ERP Single should be used. This area 806 is upper-bounded by line 808 and lower-bounded by line 802, such that it corresponds to values which satisfy both $R2 \geq R1$ and $R1 \geq P \cdot R2 + Q$. Again, for these equations, $P = (4 \cdot V/A)/(4 \cdot V/A + 2 \cdot l \cdot n/V)$, while $Q = l \cdot n/V \cdot (4 \cdot V/A + 2 \cdot l \cdot n/V)$.

Illustrative exemplary embodiments are presented below which provide some more insight into how the selection process between using C/P ERP Single and C/P ERP Multi may be implemented. These exemplary embodiments are not limiting on the invention in any way, and are meant to only provide descriptions for clarification of implementation possibilities.

In a first exemplary embodiment, a situation is described where C/P ERP Multi would provide better performance. In this first exemplary embodiment, n=10, R1=3, and R2=3+2+3=8. Table 1 shows data set recovery for the n=10 data sets read from the data storage medium. A blank status cell indicates no C/P ERP was used to recover the data set, while Single indicates C/P ERP Single was used to recover the data set, Multi indicates C/P ERP Multi was used to recover the data set, and STD indicates recovery was achieved without C/P ERP being used.

TABLE 1

| DS# | N | N + 1 | N + 2 | N + 3 | N + 4 | N + 5 | N + 6 | N + 7 | N + 8 | N + 9 |
|---|---|---|---|---|---|---|---|---|---|---|
| Status | Single | Single | | | | | Single | | | |
| Retry # | 3 | 2 | 0 | 0 | 0 | 0 | 3 | 0 | 0 | 0 |

If the following variables are assumed: V=8.473 m/s, A=10 m/s², and l=0.7 m, then the estimated elapsed time for C/P ERP Multi to execute, $T_m$, is calculated as $T_m = (8.473/10 \cdot 4 + 2 \cdot 0.7 \cdot 10/8.473) \cdot 3 = 15.1$ seconds. In comparison, the estimated elapsed time for C/P ERP Single to execute, $T_s$, is calculated as $T_s = (8.473/10 \cdot 4) \cdot 8 + 0.7 \cdot 10/8.473 = 27.9$ seconds. Therefore, in this situation, there is a greater probability that C/P ERP Multi will complete faster than C/P ERP Single, and therefore in operation 308 of FIG. 3, C/P ERP Multi would be selected. In this particular situation, C/P ERP Single is estimated to complete in almost twice as long as it takes C/P ERP Multi to complete.

Of course, the variables assumed above, including tape velocity, acceleration, and length of a data set on the tape are for exemplary purposes only and in no way limiting. Instead, the variables should be selected to correspond to a particular device used to read data from the data storage medium. For example, velocity may be anywhere from about 1 m/s to about 10 m/s or even 15 m/s, depending on the device used. Acceleration may be anywhere from about 1 m/s² to 10 m/s² or even 25 m/s², depending on the device used. Furthermore, however much length of the data storage medium is occupied by a data set may be used, such as from about 0.1 m to about 2 m. The length of a data set on the data storage medium is currently estimated based on 1 longitudinal position (LPOS) mark equaling about 0.07 m, with 1 data set occupying about 10 LPOS, so 0.7 m.

In a second exemplary embodiment, a situation is described where C/P ERP Single would provide better performance. Table 2 provides information about how each data set was read.

TABLE 2

| DS# | N | N + 1 | N + 2 | N + 3 | N + 4 | N + 5 | N + 6 | N + 7 | N + 8 | N + 9 |
|---|---|---|---|---|---|---|---|---|---|---|
| Status | Single | Single | Single | | | | Single | | | |
| Retry # | 1 | 1 | 1 | 0 | 0 | 0 | 7 | 0 | 0 | 0 |

Assuming that n=10, R1=7, and R2=1+1+1+7=10, and the following variables are assumed: V=8.473 m/s, A=10 m/s², and l=0.7 in, then the estimated elapsed time for C/P ERP Multi to execute, $T_m$, is calculated as $T_m$=(8.473/10·4+2·0.7·10/8.473)·7=35.3 s. In comparison, the estimated elapsed time for C/P ERP Single to execute, $T_s$, is calculated as $T_s$=(8.473/10·4)·10+0.7·10/8.473=34.7 s. This indicates that, just barely, C/P ERP Single should complete prior to C/P ERP Multi, and therefore, in operation 308 of FIG. 3, C/P ERP Single would be selected.

In a third exemplary embodiment, a situation is described where various types of recovery are performed within the sliding window. The previous two exemplary embodiments assumed that temp errors were always recovered with C/P ERP Single; however, some segments may have been recovered without using C/P ERP (such as a servo method, or some other set of options that do not utilize C/P ERP). In this exemplary embodiment, a segment that is recovered without using C/P ERP is excluded from the elapsed time estimates. Table 3 provides information about how each data set was read.

TABLE 3

| DS# | N | N + 1 | N + 2 | N + 3 | N + 4 | N + 5 | N + 6 | N + 7 | N + 8 | N + 9 |
|---|---|---|---|---|---|---|---|---|---|---|
| Status | Single | Single | | STD | | | Single | | | |
| Retry # | 3 | 2 | 0 | 20 | 0 | 0 | 3 | 0 | 0 | 0 |

Since DS#N+3 was recovered without C/P ERP, the amount of retires for this data set are ignored. Assuming that n=10, R1=3, and R2=3+2+3=8, and the following variables are assumed: V=8.473 m/s, A=10 m/s², and l=0.7 m, then the estimated elapsed time for C/P ERP Multi to execute, $T_m$, is calculated as $T_m$=(8.473/10·4+2·0.7·10/8.473)·3=15.1 s. In comparison, the estimated elapsed time for C/P ERP Single to execute, $T_s$, is calculated as $T_s$=(8.473/10·4)·8+0.7·10/8.473=27.9 s. This indicates that C/P ERP Multi should complete prior to C/P ERP Single, and therefore, in operation 308 of FIG. 3, C/P ERP Multi would be selected.

Figure 9:
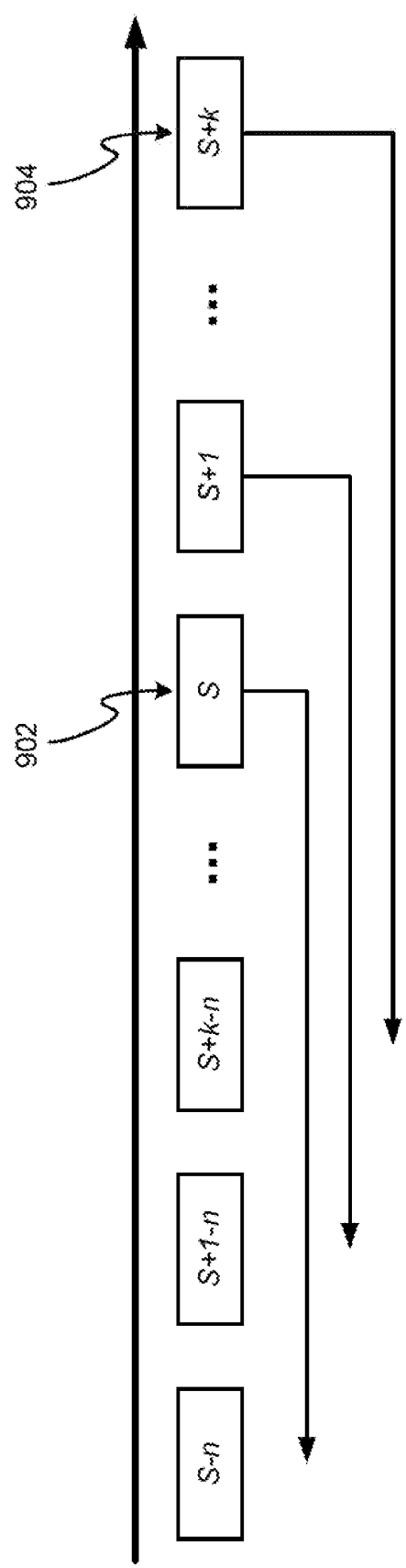
FIG. 9 shows a sliding window aspect of historical context used in determining which ERP technique to use, according to one embodiment.

Now referring to FIG. 9, a sliding window aspect of the historical context used in determining which C/P ERP technique to use is described according to one embodiment in the buffer segment {S to S+n} data set window. Buffer segment S 902 is defined as the first temp error that initialized C/P ERP Single processing. In other systems, assignment of segment S required both an "active burst" plus C/P ERP Single processing; however, the active burst condition is not needed in embodiments described herein.

As shown in FIG. 9, the C/P ERP Multi window is set as S to S+n, but C/P performance is predicted over this future window by performing estimations over the last n segments (since it is impossible to know exactly what is going to happen in the future). Therefore, historical information behaves as a sliding window based on when the current segment (C) 904 is within the data set window {S to S+n}. The current segment C is defined as the most recent C/P ERP Single temp segment within that window. So, once the first segment 902 having a temp is defined (and C/P ERP Multi is not already being performed) then every C/P ERP Single temp in the data set window {S to S+n} will rely on historical recovery information from the earlier window {S−n to S}. This is described as a sliding window since the amount of recovery history that is used depends on an offset from the current segment C=S+k. Any temp error within the data set window {S to S+n} may trigger C/P ERP Multi to be used based on the elapsed time estimates.

Figure 10:
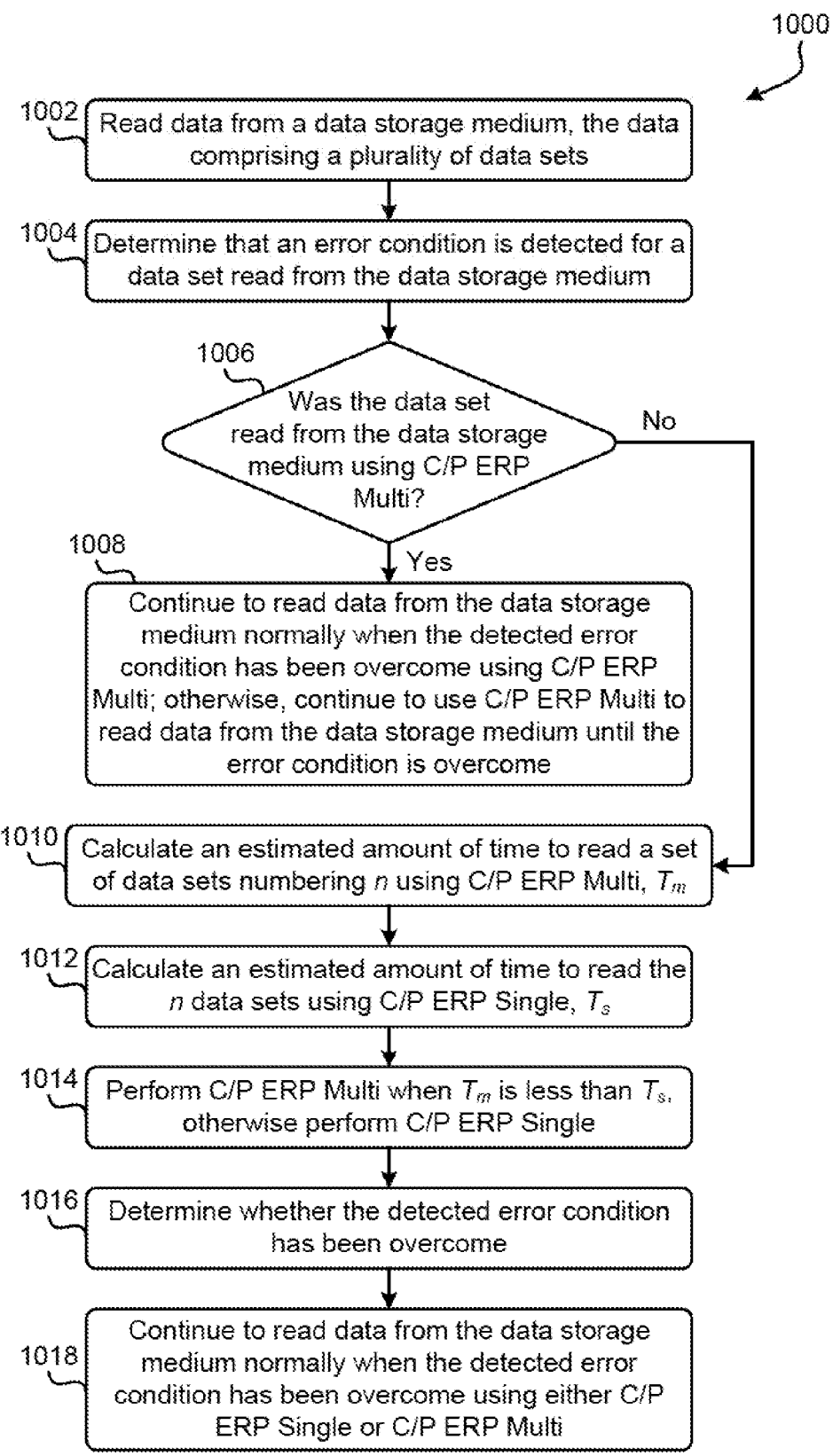
FIG. 10 shows a method, according to one embodiment.

Now referring to FIG. 10, a method 1000 for reading data from a medium using reconstructive ERP is shown according to one embodiment. The method 1000 may be performed in accordance with the present invention in any of the environments depicted in FIGS. 1-3, among others, in various embodiments. Of course, more or less operations than those specifically described in FIG. 10 may be included in method 1000, as would be understood by one of skill in the art upon reading the present descriptions.

Each of the steps of the method 1000 may be performed by any suitable component of the operating environment. For example, in various non-limiting embodiments, the method 1000 may be partially or entirely performed by a C1/C2 decoding system, a tape drive, a hard disk drive, an optical drive, a controller, a processor (such as a CPU, an ASIC, a FPGA, etc.) which may be embedded in and/or operate within a system, etc.

As shown in FIG. 10, method 1000 may initiate with operation 1002, where data is read from a data storage medium, the data comprising a plurality of data sets.

The data may be read one data set at a time, in order to allow calculations to be made between each read data set, or it may be read in a stream to allow C/P ERP Multi to be performed.

In one approach, the data storage medium may be a magnetic tape that is configured to be read by a magnetic tape drive that is configured to perform the various operations described in method 1000.

In operation 1004, it is determined that an error condition is detected for a data set read from the data storage medium. Should no error condition be detected, then normal reading of data sets from the data storage medium continues normally without the need for recovery procedures.

In operation 1006, it is determined whether the data set was read from the data storage medium using C/P ERP Multi. This determination may be made using any technique described herein, or others known in the art.

In operation 1008, when the data set was read from the data storage medium using C/P ERP Multi: data continues to be read from the data storage medium normally when the detected error condition has been overcome using C/P ERP Multi; otherwise, C/P ERP Multi is continued to be performed to read data from the data storage medium until the error condition is overcome.

Operations 1010-1018 are performed when the data set was not read from the data storage medium using C/P ERP Multi.

In operation 1010, an estimated amount of time to read a set of data sets numbering n using C/P ERP Multi, $T_m$ is calculated. The calculation may be made according to any embodiment described herein, or based on some other algorithm known in the art or that would be understood by one of skill in the art upon reading the present descriptions, including modifications to the algorithms described herein.

In operation 1012, an estimated amount of time to read the n data sets using C/P ERP Single, $T_s$, is calculated. The calculation may be made according to any embodiment described herein, or based on some other algorithm known in the art or that would be understood by one of skill in the art upon reading the present descriptions, including modifications to the algorithms described herein.

In operation 1014, C/P ERP Multi is performed when $T_m$ is less than $T_s$, otherwise C/P ERP Single is performed. The actual execution of C/P ERP Single or Multi may adhere to the descriptions thereof in the previously indicated patent applications, or according to some other technique known in the art or that would be understood by one of skill in the art upon reading the present descriptions, including modifications to the techniques described herein and elsewhere.

In operation 1016, it is determined whether the detected error condition has been overcome. This determination may be based on a number of uncorrectable errors being reduced to zero, a number of temp errors being reduced below a threshold, or some other indication of successful reading of the data set.

In operation 1018, data continues to be read from the data storage medium normally when the detected error condition has been overcome using either C/P ERP Single or C/P ERP Multi.

Normal data reading means that data is read and checked for temp errors and other conditions which may indicate that the data is not properly read from the data storage medium, as would be understood by one of skill in the art.

In one embodiment, a ring buffer that is used for storing data may be split into two portions prior to performing C/P ERP Multi, one portion being reserved for use in C/P ERP Multi. Furthermore, after the detected error condition is overcome using C/P ERP Multi, the ring buffer may be unified into one portion.

In another embodiment, $T_m$ and $T_s$ may be calculated again after each data set is read from the data storage medium (normally or using C/P ERP Single), and C/P ERP Single may be used unless a previous data set was read using C/P ERP Multi or $T_m$ is less than $T_s$, n, which case C/P ERP Multi may be performed. Furthermore, if no error conditions are encountered, then data may be read normally from the data storage medium.

According to another embodiment, $T_m$ and $T_s$ may be calculated based on historical data set recovery information over a predefined number, n, of preceding data sets. The predefined number, n, may be selected by a user. In one approach, n is in an inclusive range from 5 to 72. Of course, more or less preceding data sets than in such exemplary range may be analyzed, in more approaches.

Additionally, $T_m$ may be calculated according to any algorithm described herein, such as being based on $T_m=(4 \cdot V/A+2 \cdot 1 \cdot n/V) \cdot R1$, where V is velocity of data storage medium movement, A is accelerated velocity of the data storage medium movement, l is length of one data set on the data storage medium, and R1 is a maximum retry count per data set during the previously read n data sets.

Also, $T_s$ may be calculated according to any algorithm described herein, such as being based on $T_s=(4 \cdot V/A) \cdot R2+1 \cdot n/V$, where V is velocity of data storage medium movement, A is accelerated velocity of the data storage medium movement, l is length of one data set on the data storage medium, and R2 is a total retry count across the previously read n data sets.

Method 1000 may be executed, implemented in, and/or available to be performed using a system, apparatus, and/or computer program product, according to various embodiments.

According to one embodiment, an apparatus may include a processor (such as a hardware and/or software processor alone or in combination with the hardware processor) and logic integrated with and/or executable by the processor. The logic may be software-based, hardware-based, and/or a combination thereof according to various approaches. Execution of the logic may cause the processor to perform method 1000 or some portion thereof.

In another embodiment, a computer program product may include a computer readable storage medium having program code embodied therewith, the program code being readable and/or executable by a processor. The processor may be implemented in hardware and/or software alone or in combination, and execution of the program code may cause the processor to perform method 1000 or some portion thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus for reading data from a data storage medium, the apparatus comprising a processor and logic integrated with and/or executable by the processor, the logic being configured to:
    determine that an error condition is detected for a data set read from the data storage medium;
    determine whether the data set was read from the data storage medium using multiple cut and paste (C/P) error recovery procedure (ERP) (C/P ERP Multi); and
    in response to a determination that the data set was read from the data storage medium using C/P ERP Multi:
        continue reading data from the data storage medium normally in response to a determination that the detected error condition has been overcome using C/P ERP Multi, otherwise,
        continue using C/P ERP Multi to read data from the data storage medium until the error condition is overcome.

2. The apparatus as recited in claim 1, wherein the data storage medium is a magnetic tape that is configured to be read by a magnetic tape drive.

3. The apparatus as recited in claim 1, wherein in response to a determination that the data set was not read from the data storage medium using C/P ERP Multi, the logic is further configured to:

calculate an estimated amount of time to read a set of data sets numbering n using C/P ERP Multi, $T_m$;

calculate an estimated amount of time to read the n data sets using C/P ERP Single, $T_s$;

perform C/P ERP Multi in response to a determination that $T_m$ is less than $T_s$, otherwise perform C/P ERP Single;

determine whether the detected error condition has been overcome; and continue to read data from the data storage medium normally in response to a determination that the detected error condition has been overcome using either C/P ERP Single or C/P ERP Multi.

4. The apparatus as recited in claim 3, wherein the logic is further configured to:

divide a ring buffer used for storing data into two portions prior to performing C/P ERP Multi, one portion being reserved for use in C/P ERP Multi; and unify the ring buffer into one portion in response to a determination that the detected error condition is overcome using C/P ERP Multi.

5. The apparatus as recited in claim 3, wherein the logic is further configured to:

calculate $T_m$ and $T_s$ again after each data set is read from the data storage medium; and perform C/P ERP Single unless a previous data set was read using C/P ERP Multi or $T_m$ is less than $T_s$, then perform C/P ERP Multi.

6. The apparatus as recited in claim 3, wherein $T_m$ and $T_s$ are calculated based on historical data set recovery information over a predefined number, n, of preceding data sets.

7. The apparatus as recited in claim 3, wherein $T_m$ is calculated based on $T_m=(4 \cdot V/A + 2 \cdot l/V) \cdot R1$, wherein V is velocity of data storage medium movement, A is accelerated velocity of the data storage medium movement, l is length of one data set on the data storage medium, and R1 is a maximum retry count per data set during n previously read data sets.

8. The apparatus as recited in claim 3, wherein $T_s$ is calculated based on $T_s=(4 \cdot V/A) \cdot R2 + l \cdot n/V$, wherein V is velocity of data storage medium movement, A is accelerated velocity of the data storage medium movement, l is length of one data set on the data storage medium, and R2 is a total retry count across n previously read data sets.

9. A computer-implemented method for reading data from a data storage medium, the method comprising:

determining that an error condition is detected for a data set read from the data storage medium;

determining whether the data set was read from the data storage medium using multiple cut and paste (C/P) error recovery procedure (ERP) (C/P ERP Multi); and in response to a determination that the data set was read from the data storage medium using C/P ERP Multi:

continuing to read data from the data storage medium normally in response to a determination that the detected error condition has been overcome using C/P ERP Multi; otherwise, continuing to use C/P ERP Multi to read data from the data storage medium until the error condition is overcome.

10. The method as recited in claim 9, further comprising, when the data set was not read from the data storage medium using C/P ERP Multi:

calculating an estimated amount of time to read a set of data sets numbering n using C/P ERP Multi, $T_m$;

calculating an estimated amount of time to read the n data sets using C/P ERP Single, $T_s$;

performing C/P ERP Multi when $T_m$ is less than $T_s$, otherwise performing C/P ERP Single;

determining whether the detected error condition has been overcome; and continuing to read data from the data storage medium normally in response to a determination that the detected error condition has been overcome using either C/P ERP Single or C/P ERP Multi.

11. The method as recited in claim 10, further comprising:

dividing a ring buffer used for storing data into two portions prior to performing C/P ERP Multi, one portion being reserved for use in C/P ERP Multi; and unifying the ring buffer into one portion in response to a determination that the detected error condition is overcome using C/P ERP Multi.

12. The method as recited in claim 10, further comprising:

calculating $T_m$ and $T_s$ again after each data set is read from the data storage medium; and performing C/P ERP Single unless a previous data set was read using C/P ERP Multi or $T_m$ is less than $T_s$, then perform C/P ERP Multi.

13. The method as recited in claim 10, wherein $T_m$ and $T_s$ are calculated based on historical data set recovery information over a predefined number, n, of preceding data sets.

14. The method as recited in claim 10, wherein $T_m$ is calculated based on $T_m=(4 \cdot V/A + 2 \cdot l \cdot n/V) \cdot R1$, wherein V is velocity of data storage medium movement, A is accelerated velocity of the data storage medium movement, l is length of one data set on the data storage medium, and R1 is a maximum retry count per data set during n previously read data sets.

15. The method as recited in claim 10, wherein $T_s$ is calculated based on $T_s=(4 \cdot V/A) \cdot R2 + l \cdot n/V$, wherein V is velocity of data storage medium movement, A is accelerated velocity of the data storage medium movement, l is length of one data set on the data storage medium, and R2 is a total retry count across n previously read data sets.

16. A computer program product for reading data from a data storage medium, the computer program product comprising a computer readable storage medium having program code embodied therewith, the program code being readable and/or executable by a processor to:

determine that an error condition is detected for a data set read from the data storage medium;

determine whether the data set was read from the data storage medium using multiple cut and paste (C/P) error recovery procedure (ERP) (C/P ERP Multi); and in response to a determination that the data set was read from the data storage medium using C/P ERP Multi:

continue reading data from the data storage medium normally in response to a determination that the detected error condition has been overcome using C/P ERP Multi; otherwise, continue using C/P ERP Multi to read data from the data storage medium until the error condition is overcome.

17. The computer program product as recited in claim 16, wherein when the data set was not read from the data storage medium using C/P ERP Multi, the program code is further readable and/or executable by the processor to:

calculate an estimated amount of time to read a set of data sets numbering n using C/P ERP Multi, $T_m$;

calculate an estimated amount of time to read the n data sets using C/P ERP Single, $T_s$;

perform C/P ERP Multi when $T_m$ is less than $T_s$, otherwise perform C/P ERP Single;

determine whether the detected error condition has been overcome; and continue to read data from the data storage medium normally in response to a determination that the detected error condition has been overcome using either C/P ERP Single or C/P ERP Multi.

18. The computer program product as recited in claim 17, wherein the data storage medium is a magnetic tape that is configured to be read by a magnetic tape drive, wherein $T_m$ and $T_s$ are calculated based on historical data set recovery information over a predefined number, n, of preceding data sets.

19. The computer program product as recited in claim 17, wherein the program code is further readable and/or executable by the processor to:

divide a ring buffer used for storing data into two portions prior to performing C/P ERP Multi, one portion being reserved for use in C/P ERP Multi;

unify the ring buffer into one portion in response to a determination that the detected error condition is overcome using C/P ERP Multi;

calculate $T_m$ and $T_s$ again after each data set is read from the data storage medium; and perform C/P ERP Single unless a previous data set was read using C/P ERP Multi or $T_m$ is less than $T_s$, then perform C/P ERP Multi.

20. The computer program product as recited in claim 17, wherein $T_m$ is calculated based on $T_m=(4 \cdot V/A + 2 \cdot l \cdot n/V) \cdot R1$, wherein V is velocity of data storage medium movement, A is accelerated velocity of the data storage medium movement, l is length of one data set on the data storage medium, and R1 is a maximum retry count per data set during n previously read data sets, wherein $T_s$ is calculated based on $T_s=(4 \cdot V/A) \cdot R2 + l \cdot n/V$, and wherein R2 is a total retry count across n previously read data sets.

* * * * *